United States Patent [19]

Andrews

[11] 4,390,008
[45] Jun. 28, 1983

[54] HOT WATER TANK FOR USE WITH A COMBINATION OF SOLAR ENERGY AND HEAT-PUMP DESUPERHEATING

[75] Inventor: John W. Andrews, Sag Harbor, N.Y.

[73] Assignee: The United Stated of America as represented by the Department of Energy, Washington, D.C.

[21] Appl. No.: 163,449

[22] Filed: Jun. 26, 1980

[51] Int. Cl.³ ............................................. F24J 3/02
[52] U.S. Cl. .................................. 126/427; 126/437; 126/362; 62/235.1
[58] Field of Search ............... 126/425, 437, 422, 427, 126/400, 362; 62/235.1

[56] References Cited

U.S. PATENT DOCUMENTS

| | | | |
|---|---|---|---|
| 2,486,833 | 11/1949 | Freund | 126/437 |
| 4,003,365 | 1/1977 | Wiegand et al. | 126/432 |
| 4,027,821 | 6/1977 | Hayes et al. | 126/420 |
| 4,048,981 | 9/1977 | Hobbs | 126/422 |
| 4,062,349 | 12/1977 | Birnbreier | 126/422 |
| 4,134,544 | 1/1979 | Thomason et al. | 126/419 |
| 4,147,157 | 4/1979 | Zakhariya | 126/419 |
| 4,182,489 | 1/1980 | Lessieur | 126/422 |
| 4,226,604 | 10/1980 | Weis | 62/235.1 |
| 4,248,049 | 2/1981 | Briley | 126/437 |

FOREIGN PATENT DOCUMENTS 2364411 4/1978 France ............................ 126/437

OTHER PUBLICATIONS

"Solar Energy and Heat Pump Desuperheat are Compatible Energy Sources for Water Heating", John W. Andrews, Technical Note, Brookhaven National Laboratory, Upton, N.Y. 11973, BNL-26364.

Primary Examiner—James C. Yeung
Assistant Examiner—Lee E. Barrett

[57] ABSTRACT

A water heater or system which includes a hot water tank having disposed therein a movable baffle to function as a barrier between the incoming volume of cold water entering the tank and the volume of heated water entering the tank which is heated by the circulation of the cold water through a solar collector and/or a desuperheater of a heat pump so as to optimize the manner in which heat is imparted to the water in accordance to the demand on the water heater or system. A supplemental heater is also provided and it is connected so as to supplement the heating of the water in the event that the solar collector and/or desuperheater cannot impart all of the desired heat input into the water.

10 Claims, 2 Drawing Figures

HOT WATER TANK FOR USE WITH A COMBINATION OF SOLAR ENERGY AND HEAT-PUMP DESUPERHEATING

BACKGROUND OF THE INVENTION

The United States Government has rights to this invention pursuant to Contract No. DE-AC02-76CH00016, between the U.S. Department of Energy and Associated Universities, Inc.

Heretofore, various efforts have been made to conserve the amount of purchased energy, such as electricity, gas or oil; necessary to heat water. Currently there are two methods of effecting the heating of water to minimize the consumption of purchased energy such as electricity. The more popular method coming into vogue is the use of solar energy. Another method comprises the heating of water by bringing cold water into a heat exchange relationship with the superheated gas leaving the compressor of a heat pump, i.e. desuperheat. A disadvantage noted when solar energy is used to heat water is that a relatively large collector area is required to heat a given quantity of water to a predetermined usable temperature, and further that such solar hot water systems are most effective for only a fraction of a year, viz, the spring, summer and early fall in the temperature climate areas. Unless such solar systems are greatly oversized, they are virtually ineffective during the cold or winter months.

Conversely, heat pumps which are primarily operated during the winter months in the temperature climates, are virtually ineffective as a source for heating water in the spring and fall. Effectiveness of heat pump desuperheating in summer depends on the amount of air conditioning required.

OBJECTS

It is, therefore, an object of this invention to provide, at least for climates wherein the annual heating loads exceed the annual cooling loads, a hot water system in which solar heat and the heat obtainable from desuperheating are rendered compatible so as to provide the greater fraction of the hot water load from non-purchased energy for all months of the year.

Another object is to provide a hot water system utilizing solar energy in conjunction with the heat obtainable from desuperheating in a manner so as to reduce the amount of solar collector area otherwise required to heat water by solar energy only.

Another object is to provide a water heating system wherein solar heat is utilized in conjunction with the heat obtainable from a desuperheater in a manner in which the functioning of the hot water tank controls the proper selection of the energy source required for effecting the heating of the water in accordance with demand.

Another object of this invention is to provide a hot water tank which is operatively connected to a solar collector and a desuperheater so as to maximize the heat input from non-purchased energy sources regardless of seasonal conditions.

Another object resides in the provision of utilizing solar water heating in conjunction with the heating of water by the heat of desuperheating in a manner to maximize the heat input beyond that which each is capable of independently.

SUMMARY OF THE INVENTION

The foregoing objects and other features and advantages are attained by a water heating system comprising a hot water storage tank having a cold water inlet connected to one end portion of the tank and having a hot water inlet connected to the other end of the tank. Displaceably disposed within the tank is a floating baffle which functions to provide thermal stratification between the incoming cold water and the heated water stored therein. Operatively connected in separate circuits with the tank is a first heat source which may be in the form of a solar collector and a second heat source which may be in the form of a desuperheater (i.e., a heat exchanger to extract heat from the superheated gas produced by a heat pump). The inlet of the solar collector is connected to the bottom of the tank and the outlet of the solar collected discharges into the upper end of the tank so that cold water from below the baffle is circulated from the tank through the solar collector (or is brought back into a heat exchange relationship with the solar collector by means of an intermediate heat exchanger) and back to the tank above the baffle. The inlet to the desuperheater is connected to an intermediate portion of the tank with the outlet discharging into the upper end of the tank and above the baffle. The arrangement is such that when the baffle is below the inlet to the desuperheater, the solar collector functions to effect the preheating of the water with the desuperheater being utilized as a second pass to bring the preheated water up to predetermined temperature. When the baffle is moved above the inlet to the desuperheater, both the solar collector and desuperheater are functioning to preheat the cold water. During periods of very high demand when the baffle is located at the top of the tank, a by-pass is provided to direct the cold water from below the baffle to a point above the baffle whereby the cold water is heated by a purchased source of energy, such as electricity. The movement of the baffle within the storage tank, which is responsive to the demand or load, thus functions without the need of active controls to achieve the proper selection or utilization of the energy source necessary to effect the optimum heating requirements for the cold water in the storage tank.

FEATURES

A feature resides in the provision of a hot water storage tank having a movable baffle for effecting stratification of the cold and heated water which is responsive to demand or load so as to effect the mode or selection of the appropriate energy source to maximize the heat input with a minimum amount of purchased energy.

Another feature is to provide a water heating system in which a supplemental heater is provided to heat or supplement the heating of the water, e.g. during periods of high demand.

Other features and advantages will become more readily apparent when considered in view of the drawings and specifications in which.

DETAILED DESCRIPTION

Figure 1:
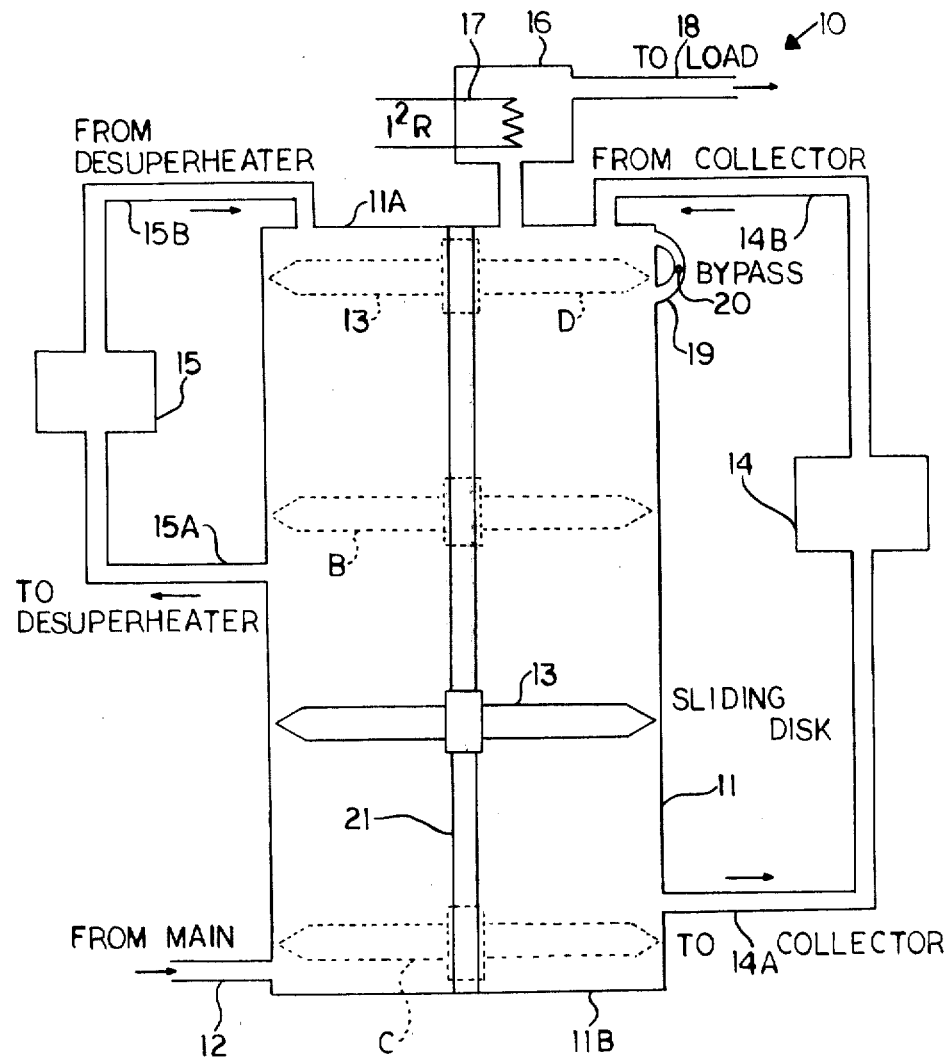
FIG. 1 is a schematic showing of a water heating system embodying the invention.

Referring to the drawings, there is shown in FIG. 1 a schematic of a hot water heating system 10 embodying the present invention. The disclosed system includes a hot water storage tank 11 having a tank body provided with water inlet 12 located in the bottom end of the tank 11. Slideably or displaceably disposed within the tank 11 is a baffle 13. In the illustrated embodiment the baffle 13 slides along a guide or stanchion 21 which extends between the top 11A and bottom 11B of the tank 11. The baffle 13 is thermally insulated and is appropriately weighted so that it will tend to sink in heated water, and float on the cold water contained in the tank. Thus, the baffle 13 defines a partition for thermal stratification of the cold water entering inlet 12 and the heated water discharging into the tank above the baffle 13 through the heated water inlets 14B and 15B, as will be hereinafter described.

Connected in circuit with the storage tank 11 are first and second heat sources, 14 and 15, respectively. Heat source 14 is in the form of a solar collector which is connected in circuit with the tank by an inlet 14A and an outlet 14B. In accordance with this invention the inlet 14A is located adjacent to the bottom of the tank 11, and as shown, it is slightly above the cold water inlet 12. The outlet 14B discharges the water heated by the solar collector 14 into the upper end of the tank above the baffle 13.

The second heat source comprises desuperheater 15 of a heat pump and which is connected in circuit with the tank by an inlet 15A and an outlet 15B. In accordance with this invention the inlet 15A is located at a point intermediate to the ends of the tank as will be hereinafter described. The locations of the inlets 14A and 15A to the solar collector 14 and desuperheater 15 respectively, are specifically arranged relative to each other so as to allow the functions of the solar collector and desuperheater to be differentiated as will become evident. The inlet 14A and inlet 15A are placed so as to obtain the heat preferentially from the solar collector at times when the combined system is more able to meet the load. This is especially so during the winter or cold months when it is desirable to obtain as much heat from the solar collector as possible with the desuperheating being used to make up the difference between the solar capacity and the load.

Connected to the tank 11 is a chamber portion 16 which includes a supplemental heater, e.g. electric heater 17, which, if necessary, e.g. during periods of very high demand, can be used as a last resort to heat the water going to the load through conduit 18, or to supplement the heating of the water initially heated by the collector 14 and/or desuperheater 15.

Located adjacent to the upper end of the tank 11 is a by-pass 19. It will be understood that the by-pass may be provided with a unidirectional valve 20 for permitting the water to flow therethrough in the direction of the water going to load only.

The operation of the system described is thus rendered dependent upon the position of the sliding baffle 13. Cold water from supply thus passes into the portion of the tank 11 below the baffle 13 through cold water inlet 12. In order for the water to pass to the upper portion of the tank, it must first flow through to the solar collector 14 where it is preheated. As long as the demand is such that the baffle 13 remains below desuperheater inlet 15A, the desuperheater effects a secondary heating of the preheated water above baffle 13, thereby affecting the needed boost to heat up the water to a service temperature. When the demand for heated water becomes sufficiently high, the baffle floating on the volume of incoming cold water will rise to a position B past desuperheater inlet 15A, and in which case desuperheater 15 functions to affect pre-heating of the water until the baffle is lowered to a point below inlet 15A. If the supply of heated water is sufficiently greater than demand, baffle 13 will move all the way down to the bottom of the tank to a position C at which time both collector 14 and desuperheater 15 will function to boost the temperature of the full tank of preheated water.

Conversely, during periods of very high demands, baffle 13 may be caused to move all the way to the top of the tank, e.g. to position D. In this case, the cold water below baffle 13 will flow around baffle 13 through by-pass 19, and be heated by electrical heater 17 in chamber 16.

As the primary function of collector 14 in the described system is to effect a preheat function, a flow much lower than that usually encountered in collectors can be used, thereby permitting a significant temperature rise to occur in collector 14. Pumping power to operate the collector loop is thereby significantly reduced.

From the foregoing, it will be noted that no active controls are required in the tank to achieve the proper selection of the energy source for optimum heating. For example, when the available solar energy is insufficient to meet demand, collector 14 operates entirely in its preheat mode so as to maximize its efficiency. When more sunlight is available, the collector will operate for longer periods of time. When this occurs, the baffle will descend toward the bottom of the tank more often, and collector 14 is thereby able to take up some of the temperature boosting function as well. Although it will be noted that in this mode it is less efficient, it will so operate only when insolation is plentiful.

Similarly, the normal mode of operation for desuperheater 15 is to boost the temperature in the upper portion of the tank to the desired service value. However, at times of high demand, and when the baffle rises above desuperheater inlet 15A, as when at position B, the rate at which desuperheater adds heat to the water is greatly increased, due to the lower inlet temperature to desuperheater 15.

Defining the co-efficient of performance (COP) as the ratio of delivered thermal energy to the purchase energy, such as the electricity required, and assuming a COP of 14 for the solar operating system, 20 for the summertime desuperheating system (in the cooling mode, the heat being used would be otherwise wasted), 2.5 for wintertime desuperheating, and 1 for electric resistance heating than the seasonal average COP for the various operating systems can be estimated as follows:

a. Electric resistance mode only ($I^2R$): −1.0
b. Solar only with $I^2R$ back up: −2.1
c. Desuperheat only with $I^2R$ back up: −1.7
d. Solar plus desuperheat with $I^2R$ back up: −4.7

It is also noted that to attain a 4.7 COP with a solar heating system only, that more than twice as much collector area would be required than with the described system. Thus, with the system herein described, the compatible utilization of a solar collector and a desuperheater of a heat pump to heat water is capable of attaining a COP of 4.7 with a reduction of solar collector area below that required for solar heating only.

The location of desuperheater inlet 15A would, in the absence of detailed information concerning the relative input from the collector and the desuperheater, be placed midway between the top 11A and bottom 11B of the tank 11. Such inputs would depend on climate, building type, and solar collector area. Specific optimization of the location of desuperheater inlet 15A could be performed via transient simulation of the combined system by means of a digital computer.

The determination of the exact optimum location of the desuperheater inlet 15A can be expected to be the function of the temperature of the superheated refrigerant and of the effectiveness of the desuperheater 15 as these characteristics will influence the return water temperature from desuperheater 15. The higher the return water temperature of desuperheater 15, the more suitable desuperheater 15 becomes for the boosting mode, and the closer to the top of the tank the desuperheater inlet 15A may be located.

Figure 2:
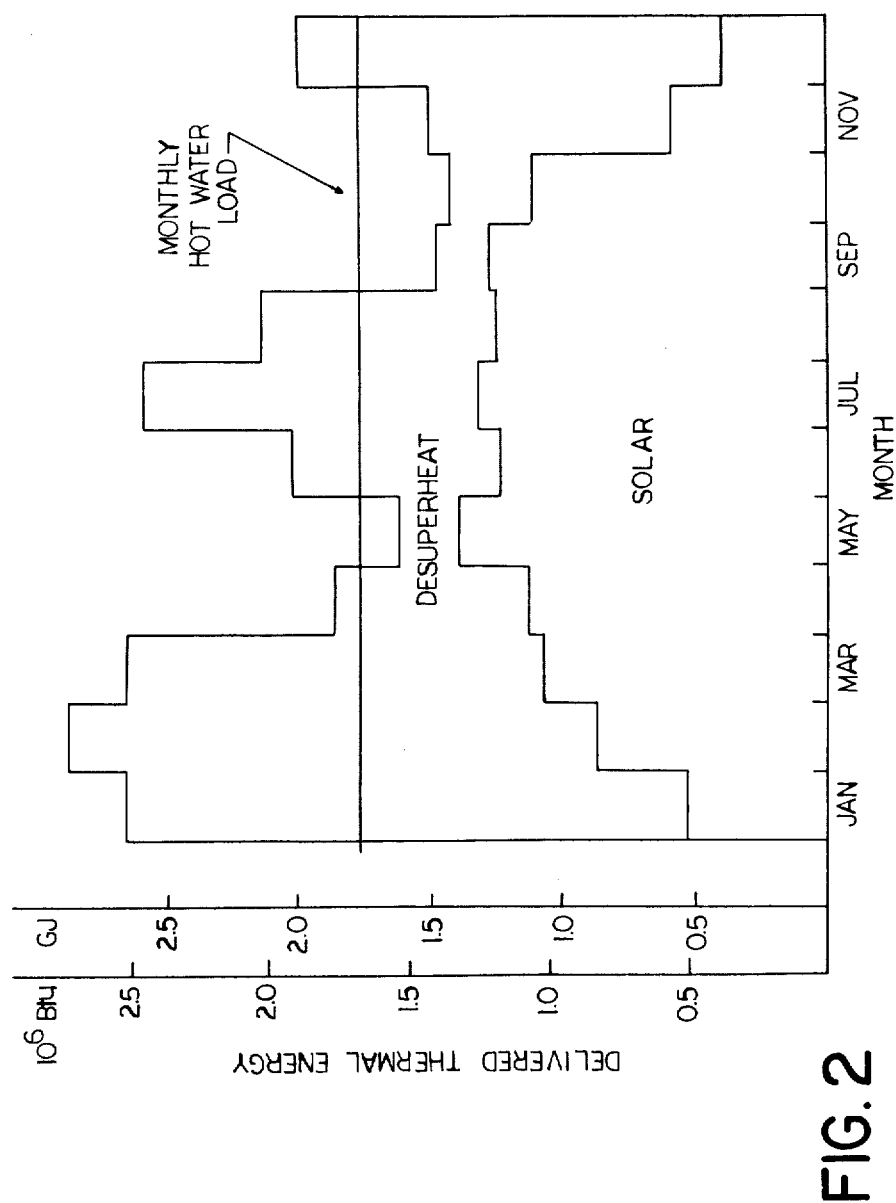
FIG. 2 shows a graphic representation of a monthly load calculation for hot water obtainable by a system embodying the invention.

FIG. 2 illustrates an exemplary load calculation for hot water obtainable by the described system, exemplified by FIG. 1, in a temperature climate such as for New York having an annual hot water load of 21.1 GJ ($20 \times 10^6$ BTU) and a heating and cooling load of 63.4 GJ ($60 \times 10^6$ BTU) and 21.1 GJ ($20 \times 10^6$ BTU) respectively. The load calculation of FIG. 2 are predicated upon utilizing a solar collector heat exchanger combination having an efficiency, with the collector fluid inlet temperature equal to the ambient temperature, of 0.7 and an overall collector heat loss coefficient of 16.4 $KJ/m^2$ - hr - °C. (0.8 $BTU/ft^2$ - hr - °F.). The characteristics selected thus approximate those of a singleglazed, selective surface collector having a collector area of 5.95 $m^2$ or 64 $ft^2$. The solar fraction was calculated from f-chart [1] using typical meterological year weather data [2].

The heat obtainable from desuperheating is from an efficient heat pump estimated to be between 10% and 20% of the heating or cooling load. The results obtained are predicated on a condensing temperature of 43° C. (110° F.); 80% adiabatic efficiency, 7° C. (45° F.) evaporating temperature for cooling and −7° C. (20° F.) evaporating temperature for heating; with the available superheat being dependent on the refrigerant used, R-22, giving more superheat than R-12, although the calculated efficiencies for the two refrigerants are not very different. As shown in FIG. 2, the amount of hot water obtained for desuperheating was based on delivery of 15% of the heating and cooling load to the hot water. Thus, the compensating affect of solar energy and desuperheat is evident in FIG. 2 for the given parameters.

While the invention has been described with respect to the described embodiment, it will be readily understood and appreciated that variations and modifications may be made without departing from the spirit or scope of the invention.

In particular, it should be noted that while the invention has been described with respect to solar collectors and desuperheaters, the present invention may be used in any system for heating water where it is desired to use two heat sources having different characteristics, where the use of one source is to be maximized, by connecting such source as the first source.

What is claimed is:

1. A water heating system comprising a tank adapted to contain a supply of water to be heated, a cold water inlet adjacent to one end thereof, a hot water outlet adjacent to the opposite end thereof, first means for heating said water, said first means withdrawing water from the end of said tank adjacent to said cold water inlet and reintroducing said water into said tank at the opposite end, and a displaceable baffle disposed within said tank, said baffle defining a barrier between the volume of cold water and the volume of heated water in said tank while allowing the volumes to vary as water is heated and/or drawn off for use, and a second means for heating said water, said second means withdrawing water from a position intermediate to the ends of said tank and reintroducing said water at the end opposite said cold water inlet, whereby either cold water from one side of said baffle, or heated water from the opposite side of said baffle is circulated through said second heating means, depending on the position of said baffle within said tank.

2. A hot water tank as defined in claim 1 wherein said baffle comprises an insulated baffle.

3. A hot water tank as defined in claim 1 wherein said baffle include means whereby said baffle is weighted to sink in said heated water and float on said cold water.

4. A hot water tank as defined in claim 1 wherein said first heating means further comprises a solar collector and said second heating means further comprises a desuperheater of a heat pump.

5. A hot water tank as defined in claim 1 and including a supplemental heater operatively connected to said tank body to supplement the heating of said water.

6. A hot water tank as defined in claim 1 and including a by-pass means adjacent to the upper end of the tank body for effecting a by-pass of the water from below the baffle to above the baffle when the baffle is located adjacent to the upper end of said tank body, and a supplemental heater means connected to said tank for affecting the heating of said by-passed water.

7. A hot water system comprising a hot water storage tank, a baffle displaceably disposed within said tank forming a moving barrier between the volume of cold water entering said tank and the heated water in said tank, a first heat exchanger in the form of a solar collector connected in circuit with said tank, said solar collector having an inlet connected to one end of the tank and an outlet connected to the other end of the tank whereby cold water from below said baffle is circulated from said tank through said collector and back to said tank above said baffle, and a second heat exchanger in the form of a desuperheater connected in circuit with said tank, said desuperheater having an inlet connected intermediate to the ends of said tank and an outlet connected to said one end of the tank whereby, depending upon the position of said baffle relative to said desuperheater inlet, cold water from below said baffle or solar preheated water from above said baffle is circulated from said tank to said desuperheater to be further heated thereby, and an electric resistance heater operatively connected to said tank as a back-up heater for the water in said tank.

8. A hot water system as defined in claim 7 and including a by-pass adjacent to the upper end of the tank for effecting a by-pass of the cold water in said tank around said baffle during periods of high demand on said system.

9. A water heating system utilizing compatible energy sources for heating water comprising a water tank, a cold water inlet means located adjacent to the bottom of the tank, a solar collector, said solar collector having an inlet means and an outlet means connected in circuit with said tank, said inlet to said collector being disposed above said cold water inlet means adjacent to the bottom of the tank, and said outlet means being connected in circuit with said tank adjacent to the upper end thereof, a heat pump desuperheater having an inlet means and outlet means, said desuperheater inlet means being connected in circuit with said tank intermediate to the bottom and upper ends of said tank and said desuperheater outlet means being connected to the upper end of said tank, and a sliding baffle disposed within said tank which is displaceable therein to define a barrier to separate the volume of incoming cold water from the heated water, whereby said solar collector functions as a preheater for the water flowing therethrough, when said baffle is disposed above said collector inlet means and said desuperheater functioning to affect secondary heating of said preheated water when said baffle is disposed below said desuperheater inlet, and said solar collector and desuperheater both functioning as preheaters when said baffle is disposed above said desuperheater inlet means.

10. A water heating system as defined in claim 9 and including a supplemental heater operatively connected to said tank for bringing water heated by said solar collector and desuperheater up to a predetermined temperature if necessary.

* * * * *